United States Patent
Sun et al.

(10) Patent No.: US 12,100,954 B2
(45) Date of Patent: Sep. 24, 2024

(54) TRANSIENT STABILITY ASSESSMENT METHOD FOR AN ELECTRIC POWER SYSTEM

(71) Applicant: Tsinghua University, Beijing (CN)

(72) Inventors: Hongbin Sun, Beijing (CN); Yanzhen Zhou, Beijing (CN); Qinglai Guo, Beijing (CN); Bin Wang, Beijing (CN); Wenchuan Wu, Beijing (CN); Zhengcheng Wang, Beijing (CN); Jian Lan, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 733 days.

(21) Appl. No.: 17/383,764

(22) Filed: Jul. 23, 2021

(65) Prior Publication Data
US 2022/0360084 A1 Nov. 10, 2022

(30) Foreign Application Priority Data
Apr. 29, 2021 (CN) .......................... 202110471521.5

(51) Int. Cl.
- *G06F 113/04* (2020.01)
- *G06N 3/04* (2023.01)
- *G06N 3/08* (2023.01)
- *H02J 3/24* (2006.01)

(52) U.S. Cl.
CPC .................. *H02J 3/24* (2013.01); *G06N 3/04* (2013.01); *G06N 3/08* (2013.01); *G06F 2113/04* (2020.01); *H02J 2203/20* (2020.01)

(58) Field of Classification Search
CPC .......... H02J 3/24; H02J 2203/20; G06N 3/04; G06N 3/08; G06F 2113/04
See application file for complete search history.

(56) References Cited

U.S. PATENT DOCUMENTS

| | | | |
|---|---|---|---|
| 11,861,528 B1* | 1/2024 | Brager | G06Q 50/184 |
| 2018/0204111 A1* | 7/2018 | Zadeh | G06V 10/764 |
| 2020/0320769 A1* | 10/2020 | Chen | G06F 18/214 |
| 2022/0206055 A1* | 6/2022 | Verrax | G01R 31/085 |

* cited by examiner

*Primary Examiner* — Beau D Spratt
(74) *Attorney, Agent, or Firm* — Hodgson Russ LLP (57) ABSTRACT

A transient stability assessment method for an electric power system is disclosed. Transient stability tags and steady-state data of the electric power system before a failure occurs are collected from transient stability simulation data. Data sets under different predetermined failures are obtained based on a statistical result of the transient stability tags and a maximum-minimum method. A similarity evaluation index between different predetermined failures is constructed based on a Jaccard distance and a Hausdorff distance. Different predetermined failures are clustered based on a clustering algorithm. A parameters-shared siamese neural network is trained for different predetermined failures in each cluster to obtain a multi-task siamese neural network for the transient stability assessment. Transient stability assessment results of the electric power system under all the predetermined failures are obtained based on the statistical result of the transient stability tags and the multi-task siamese neural network for the transient stability assessment.

2 Claims, 4 Drawing Sheets

*l*-th multi-task siamese neural network $M_l$

| | normalized input features | | | | transient stability tags of predetermined failure $E(1)$ |
|---|---|---|---|---|---|
| | $\tilde{P}_{Gi}^{1}$ | $\tilde{V}_{Gi}^{1}$ | $\tilde{P}_{Lj}^{1}$ | $\tilde{Q}_{Lj}^{1}$ | $y_{E(1)}^{1}$ |
| | $\tilde{P}_{Gi}^{2}$ | $\tilde{V}_{Gi}^{2}$ | $\tilde{P}_{Lj}^{2}$ | $\tilde{Q}_{Lj}^{2}$ | $y_{E(1)}^{2}$ |
| | ... | ... | ... | ... | ... |
| data set $D_{\text{fault}}(1)$ of predetermined failure $E(1)$ | $\tilde{P}_{Gi}^{s_0}$ | $\tilde{V}_{Gi}^{s_0}$ | $\tilde{P}_{Lj}^{s_0}$ | $\tilde{Q}_{Lj}^{s_0}$ | $y_{E(1)}^{s_0}$ |
| | $\tilde{P}_{Gi}^{s_0+1}$ | $\tilde{V}_{Gi}^{s_0+1}$ | $\tilde{P}_{Lj}^{s_0+1}$ | $\tilde{Q}_{Lj}^{s_0+1}$ | $y_{E(1)}^{s_0+1}$ |
| | $\tilde{P}_{Gi}^{s_0+2}$ | $\tilde{V}_{Gi}^{s_0+2}$ | $\tilde{P}_{Lj}^{s_0+2}$ | $\tilde{Q}_{Lj}^{s_0+2}$ | $y_{E(1)}^{s_0+2}$ |
| | ... | ... | ... | ... | ... |
| | $\tilde{P}_{Gi}^{s_0+s_1}$ | $\tilde{V}_{Gi}^{s_0+s_1}$ | $\tilde{P}_{Lj}^{s_0+s_1}$ | $\tilde{Q}_{Lj}^{s_0+s_1}$ | $y_{E(1)}^{s_0+s_1}$ |

...

| | normalized input features | | | | transient stability tags of predetermined failure $E(b)$ |
|---|---|---|---|---|---|
| | $\tilde{P}_{Gi}^{1}$ | $\tilde{V}_{Gi}^{1}$ | $\tilde{P}_{Lj}^{1}$ | $\tilde{Q}_{Lj}^{1}$ | $y_{E(b)}^{1}$ |
| | $\tilde{P}_{Gi}^{2}$ | $\tilde{V}_{Gi}^{2}$ | $\tilde{P}_{Lj}^{2}$ | $\tilde{Q}_{Lj}^{2}$ | $y_{E(b)}^{2}$ |
| | ... | ... | ... | ... | ... |
| data set $D_{\text{fault}}(b)$ of predetermined failure $E(b)$ | $\tilde{P}_{Gi}^{s_0}$ | $\tilde{V}_{Gi}^{s_0}$ | $\tilde{P}_{Lj}^{s_0}$ | $\tilde{Q}_{Lj}^{s_0}$ | $y_{E(b)}^{s_0}$ |
| | $\tilde{P}_{Gi}^{s_0+(b-1)s_1+1}$ | $\tilde{V}_{Gi}^{s_0+(b-1)s_1+1}$ | $\tilde{P}_{Lj}^{s_0+(b-1)s_1+1}$ | $\tilde{Q}_{Lj}^{s_0+(b-1)s_1+1}$ | $y_{E(b)}^{s_0+(b-1)s_1+1}$ |
| | $\tilde{P}_{Gi}^{s_0+(b-1)s_1+2}$ | $\tilde{V}_{Gi}^{s_0+(b-1)s_1+2}$ | $\tilde{P}_{Lj}^{s_0+(b-1)s_1+2}$ | $\tilde{Q}_{Lj}^{s_0+(b-1)s_1+2}$ | $y_{E(b)}^{s_0+(b-1)s_1+2}$ |
| | ... | ... | ... | ... | ... |
| | $\tilde{P}_{Gi}^{s_0+bs_1}$ | $\tilde{V}_{Gi}^{s_0+bs_1}$ | $\tilde{P}_{Lj}^{s_0+bs_1}$ | $\tilde{Q}_{Lj}^{s_0+bs_1}$ | $y_{E(b)}^{s_0+bs_1}$ |

FIG. 2B

TRANSIENT STABILITY ASSESSMENT METHOD FOR AN ELECTRIC POWER SYSTEM

CROSS-REFERENCE TO RELATED APPLICATION

This application claims priority to Chinese Patent Application No. 202110471521.5, filed Apr. 29, 2021, the entire disclosure of which is incorporated herein by reference.

FIELD

The present disclosure relates to a field of stability analysis technology of an electric power system, and more particularly relates to a transient stability assessment method for an electric power system.

BACKGROUND

Transient instability is a significant cause of widespread electric outages of an electric power system. One of important problems considered in safety prevention and control of the electric power system is how to accurately determine the transient stability of the electric power system.

Recently, data-driven methods such as support vector machines, extreme learning machines and so on are used to analyze the transient stability of the electric power system with a predetermined failure. Generally, since the failure does not occur yet, steady-state variables are used as the input features. However, the electric power system has different transient stabilities in a same operation mode under different predetermined failures, such that data sets under different predetermined failures are used to construct multiple machine learning models respectively to obtain multiple transient stability assessment models under different predetermined failures.

In fact, data sets under similar failures are similar and the respective transient stability assessment models are similar. If the similar data sets are used to train different transient stability assessment models, the similar data sets cannot be used adequately, which goes against improvement of model performance with limited data sets. The present disclosure introduces a Multi-Task Learning and Siamese Network and proposes a transient stability assessment method based on the Multi-Task Learning and Siamese Network for an electric power system in consideration of multiple predetermined failures. A cluster method is used to cluster data sets under different failures, and classifying different failures into different clusters according to a similarity evaluation index between different failures. The Multi-Task Learning and Siamese Network is used to learn the data sets under different failures in the same cluster, which is equivalent to effectively increasing the amount of training data for the transient stability assessment task per failure, such that a generalization ability of the transient stability assessment model under the predetermined failure may be improved.

SUMMARY

An objective of the present disclosure is to provide a transient stability assessment method for an electric power system. For a transient stability assessment under a predetermined failure, the present disclosure adopts a cluster method to cluster data sets under different predetermined failures to classify the data sets into different clusters according to a similarity and performing training on the data sets under different failures in a same cluster to construct a multi-task siamese neural network for the transient stability assessment under different predetermined failures. An accuracy of the transient stability assessment model can be improved effectively through the similar data sets and the multi-task siamese neural network.

The transient stability assessment method for an electric power system provided in the present disclosure collects steady-state data of the electric power system before a failure occurs and transient stability tags from transient stability simulation data, obtains data sets under different predetermined failures based on a statistical result of the transient stability tags and a maximum-minimum method, constructs a similarity evaluation index between different predetermined failures based on a Jaccard distance and a Hausdorff distance, obtains clusters of different failures based on a clustering algorithm, trains a parameters-shared siamese neural network for different predetermined failures in each cluster to obtain a multi-task siamese neural network for the transient stability assessment, and obtains transient stability assessment results of the electric power system under all $f$ predetermined failures based on the statistical result of the transient stability tags and the multi-task siamese neural network for the transient stability assessment.

The transient stability assessment method for the electric power system provided in the present disclosure has the following advantages.

According to the transient stability assessment method for an electric power system of the present disclosure, the similarity between data sets under different predetermined failures in the electric power system is considered to construct the similarity evaluation index based on the Jaccard distance and the Hausdorff distance, the data sets under different predetermined failures are clustered based on the similarity evaluation index, and the parameters-shared multi-task siamese neural network for the transient stability assessment is trained for different predetermined failures in the same cluster. By training the parameters-shared siamese neural network using the data sets under different predetermined failures, the amount of training data per task is increased, such that the generalization ability of the transient stability assessment model of the electric power system may be improved and the accuracy of the transient stability assessment result of the electric power system may be improved.

BRIEF DESCRIPTION OF THE DRAWINGS

FIG. 2A and FIG. 2B are a schematic diagrams showing step (4-1) of FIG. 1A.

DETAILED DESCRIPTION

The transient stability assessment method for an electric power system provided in the present disclosure collects data and transient stability tags of the electric power system before a failure occurs from transient stability simulation data, obtains data sets under different predetermined failures based on a statistical result of the transient stability tags and a maximum-minimum method, constructs a similarity evaluation index between different predetermined failures based on a Jaccard distance and a Hausdorff distance, obtains clusters of different failures based on a clustering algorithm, trains a parameters-shared siamese neural network for different predetermined failures in each cluster to obtain a multi-task siamese neural network for the transient stability assessment, and obtains transient stability assessment results of the electric power system under all $f$ predetermined failures based on the statistical result of the transient stability tags and the multi-task siamese neural network for the transient stability assessment.

Figure 1A:
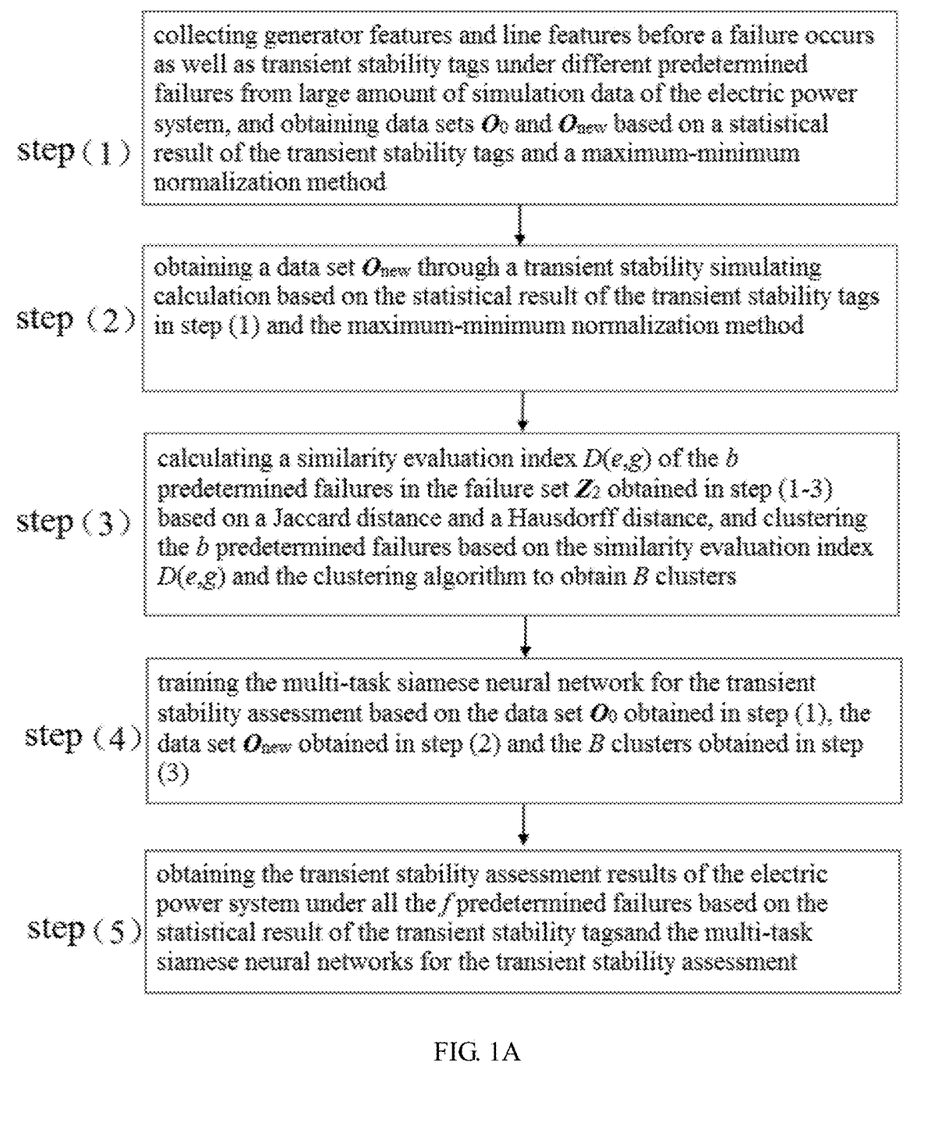
FIG. 1A is a flow chart of a transient stability assessment method for an electric power system according to an embodiment of the present disclosure.

As illustrated in FIG. 1A, the transient stability assessment method for an electric power system may include the following steps.

(1) $s_0$ operating conditions are set based on historical operational aspects and future plannings of the electric power system in consideration of a situation that the electric power system may have heavy loads in future. $f$ predetermined failures are set for each operating condition. A simulating calculation is performed on transient stabilities of the electric power system under the $f$ predetermined failures occurring in the so operating conditions using a numerical computation method, respectively. Generator features and line features before the failure occurs as well as transient stability tags under different predetermined failures are collected. A data set $O_0$ is obtained based on a statistical result of the transient stability tags and a maximum-minimum normalization method. The step may include the following.

(1-1) for the electric power system having N generators, so operating conditions are set based on historical operational aspects and future plannings of the electric power system in consideration of a situation that the electric power system may have heavy loads in future. $f$ predetermined failures are set for each operating condition. A simulating calculation is performed on transient stabilities of the electric power system under the $f$ predetermined failures in the so operating conditions using a numerical computation method. An active power $P_{Gi}^k$ and a generator voltage $V_{Gi}^k$ of each generator, an active power $P_{Lj}^k$ and an reactive power $Q_{Lj}^k$ of each line before a failure occurs and the transient stability tags $[y_1^k, y_2^k, \ldots, y_a^k, \ldots, y_f^k]$ in the k-th operating condition are collected to construct a raw data set $[P_{Gi}^k, V_{Gi}^k, P_{Lj}^k, Q_{Lj}^k y_1^k, y_2^k, \ldots, y_a^k, \ldots, y_f^k]$. k represents a numerical order of the operating condition, i.e., the k-th operating condition in the so operating conditions, k=1, 2, ..., $s_0$. i represents a numerical order of the generator, i.e., the i-th generator, i=1, ..., N. j represents a numerical order of the line, i.e., the j-th line, j=1, ..., M. Mrepresents a total number of lines in the electric power system. $y_a^k$ represents the transient stability tag of the electric power system under the a-th predetermined failure occurring in the k-th operating condition. a represents a numerical order of the predetermined failure, i.e., the a-th predetermined failure, a=1, ... $f$ If a transient instability occurs in the electric power system after the a-th predetermined failure occurs in the k-th operating condition, $y_a^k=1$. If the electric power system can maintain transient stability after the a-th predetermined failure occurs in the k-th operating condition, $y_a^k=0$. In an embodiment of the present disclosure, the electric power system may be a New England 10 Generator 39 Bus System which includes N=10 generators and M=34 lines. The number of operating conditions is set to $s_0$=5000. The predetermined failures may include three-phase permanent short-circuit faults occurring in each of the 34 lines, and the fault clearing time may be 0.1 second, such that the number of predetermined failures is set to $f$=34.

(1-2) based on a maximum-minimum normalization method, $P_{Gi}^k, V_{Gi}^k, P_{Lj}^k$ and $Q_{Lj}^k$ in the raw data set obtained in step (1-1) are normalized to obtain a normalized active power $\tilde{P}_{Gi}^k$ and a normalized generator voltage $\tilde{V}_{Gi}^k$ of each generator, a normalized active power $\tilde{\tilde{P}}_{Lj}^k$ and a normalized inactive power $\tilde{Q}_{Lj}^k$ of each line before a failure occurs in the k-th operating condition.

A normalization formula may be denoted as follows.

$$\tilde{P}_{Gi}^k = \frac{P_{Gi}^k - \min_{k=1,\ldots,s_0}(P_{Gi}^k)}{\max_{k=1,\ldots,s_0}(P_{Gi}^k) - \min_{k=1,\ldots,s_0}(P_{Gi}^k)}$$

$$\tilde{V}_{Gi}^k = \frac{V_{Gi}^k - \min_{k=1,\ldots,s_0}(V_{Gi}^k)}{\max_{k=1,\ldots,s_0}(V_{Gi}^k) - \min_{k=1,\ldots,s_0}(V_{Gi}^k)}$$

$$\tilde{P}_{Lj}^k = \frac{P_{Lj}^k - \min_{k=1,\ldots,s_0}(P_{Lj}^k)}{\max_{k=1,\ldots,s_0}(P_{Lj}^k) - \min_{k=1,\ldots,s_0}(P_{Lj}^k)}$$

$$\tilde{Q}_{Lj}^k = \frac{Q_{Lj}^k - \min_{k=1,\ldots,s_0}(Q_{Lj}^k)}{\max_{k=1,\ldots,s_0}(Q_{Lj}^k) - \min_{k=1,\ldots,s_0}(Q_{Lj}^k)}$$

(1-3) values of the transient stability tags $[y_1^k, y_2^k, \ldots, y_a^k, \ldots, y_f^k]$ in the $s_0$ operating conditions obtained in step (1-1) are counted. If the transient stability tag $y_a^k$ under the a-th predetermined failure satisfies $$\sum_{k=1}^{s_0} y_a^k = s_0,$$

it indicates that the a-th predetermined failure always causes the k=1 transient instability of the electric power system, then the a-th predetermined failure may be classified into a failure set $Z_1$ and the subsequent construction of transient stability assessment siamese neural network is not performed. If the transient stability tag $y_a^k$ under the a-th predetermined failure satisfies $$\sum_{k=1}^{s_0} y_a^k = 0,$$

it indicates that the a-th predetermined failure does not cause the transient instability of the electric power system, then the a-th predetermined failure may be classified into a failure set $Z_0$ and the subsequent construction of transient stability assessment siamese neural network is not performed. If the transient stability tag $y_a^k$ under the a-th predetermined failure satisfies $$0 < \sum_{k=1}^{s_0} y_a^k < s_0,$$

it indicates that the a-th predetermined failure may cause the transient instability of the electric power system in some operating conditions, then the a-th predetermined failure may be classified into a failure set $Z_2$. Assuming that $Z_2$ includes b predetermined failures, the b predetermined failures may be denoted as E(1), E(2), . . . ,E(b), and the transient stability tags of the b predetermined failures may be denoted as $y_{E(1)}{}^k, y_{E(2)}{}^k, y_{E(b)}{}^k$. In an embodiment of the present disclosure, the failure set $Z_1$ is empty, the failure set $Z_0$ includes one predetermined failure, and the failure set $Z_2$ includes 33 predetermined failures, i.e., b=33.

(1-4) a pre-processed data set $O_0$ is obtained based on $\check{P}_{Gi}{}^k, \check{V}_{Gi}{}^k, \check{P}_{Lj}{}^k$ and $\check{Q}_{Lj}{}^k$ obtained in step (1-2) and the transient stability tags $y_{E(1)}{}^k y_{E(2)}{}^k, \ldots, y_{E(b)}{}^k$ in the failure set $Z_2$ obtained in step (1-3). The data set $O_0$ may be represented as follows.

$$O_0=[\check{P}_{Gi}{}^k,\check{V}_{Gi}{}^k,\check{P}_{Lj}{}^k,\check{Q}_{Lj}{}^k,y_{E(1)}{}^k y_{E(2)}{}^k,\ldots,y_{E(b)}{}^k]$$

(2) $s_1 \times b$ operating conditions are set based on historical operational aspects and future plannings of the electric power system in consideration of a situation that the electric power system may have heavy loads in future. By considering the b predetermined failures in the failure set $Z_2$ obtained in step (1-3), a transient stability simulating calculation is performed using a numerical computation method to obtain generator features and line features before a failure occurs as well as transient stability tags under different predetermined failures. And a new data set $O_{new}$ is obtained based on a statistical result of the transient stability tags and a maximum-minimum normalization method as described in step (1-2). The step may include the following.

(2-1) $s_1 \times b$ operating conditions are set for the electric power system as described in step (1-1) based on historical operational aspects and future plannings of the electric power system in consideration of a situation that the electric power system may have heavy loads in future. The $s_1 \times b$ operating conditions may be denoted as $s_0+1, s_0+2, \ldots, s_0+s_1 \times b$. A transient stability simulating calculation is performed on the $E(1+\lfloor(d-1-s_0)/s_1\rfloor)$-th predetermined failure in the failure set $Z_2$ occurring in the d-th operating condition obtained in step (1-3) using a numerical computation method. An active power $P_{Gi}{}^d$ and a generator voltage $V_{Gi}{}^d$ of each generator, an active power $P_{Lj}{}^d$ and an reactive power $Q_{Lj}{}^d$ of each line before a failure occurs and the transient stability tags $y_{E(1+\lfloor(d-1-s_0)/s_1\rfloor)}{}^d$ in the d-th operating condition are collected to obtain a data set $[P_{Gi}{}^d, V_{Gi}{}^d, P_{Lj}{}^d Q_{Lj}{}^d, y_{E(1+\lfloor(d-1-s_0)/s_1\rfloor)}{}^d]$, where $d=s_0+1, s_0+2, \ldots, s_0+s_1 \times b$. In an embodiment of the present disclosure, $s_1=3000$.

(2-2) based on a maximum-minimum normalization method as described in step (1-2), $P_{Gi}{}^d V_{Gi}{}^d, P_{Lj}{}^d$ and $Q_{Lj}{}^d$ in the data set $[P_{Gi}{}^d V_{Gi}{}^d, P_{Lj}{}^d Q_{Lj}{}^d, y_{E(1+\lfloor(d-1-s_0)/s_1\rfloor)}{}^d]$ obtained in step (2-1) are normalized to obtain a normalized active power $\check{P}_{Gi}{}^d$ and a normalized generator voltage $\check{V}_{Gi}{}^d$ of each generator, a normalized active power $\check{P}_{Lj}{}^d$ and a normalized reactive power $\check{Q}_{Lj}{}^d$ of each line before a failure occurs in the d-th operating condition.

(2-3) a pre-processed data set $O_{new}$ is obtained based on $\check{P}_{Gi}{}^d, \check{V}_{Gi}{}^d, \check{P}_{Lj}{}^d$ and $\check{Q}_{Lj}{}^d$ obtained in step (2-2) and the transient stability tags $y_{E(1+\lfloor(d-1-s_0)/s_1\rfloor)}{}^d$ obtained in step (2-1). The data set $O_{new}$ may be represented as follows.

$$O_{new}=[\check{P}_{Gi}{}^d,\check{V}_{Gi}{}^d,\check{P}_{Lj}{}^d,\check{Q}_{Lj}{}^d,y_{E(1+\lfloor(d-1-s_0)/s_1\rfloor)}{}^d]$$

(3) based on a Jaccard distance index and a Hausdorff distance index, a similarity evaluation index D(e,g) of the b predetermined failures in the failure set $Z_2$ obtained in step (1-3) is calculated. e represents the e-th predetermined failure in the failure set $Z_2$ obtained in step (1-3), e=E(1), . . . , E(b). g represents the g-th predetermined failure in the failure set $Z_2$ obtained in step (1-3), g=E(1), . . . , E(b) and g≠e. The b predetermined failures in the failure set $Z_2$ obtained in step (1-3) are clustered based on the similarity evaluation index D(e,g) and a clustering algorithm, to obtain B clusters. The l-th cluster includes p(l) predetermined failures, l=1, . . . ,B. The step may include the following.

(3-1) a Jaccard distance index between a transient stability tag vector $(y_e^1, y_e^2 \ldots, y_e^{s^0})$ under the e-th predetermined failure in the failure set $Z_2$ occurring in all the so operating operations and a transient stability tag vector $(y_g^1, y_g^2, \ldots, y_g^{s^0})$ under the g-th predetermined failure in the failure set $Z_2$ occurring in all the so operating operations is determined as follows.

$$J(e, g) = \frac{M_{01} + M_{10}}{M_{01} + M_{11} + M_{10}}$$

$M_{00}$ represents the number of operating conditions where both $y_e^k$ and $y_g^k$ equal to 0, $M_{01}$ represents the number of operating conditions where $y_e^k$ equals to 0 but $y_g^k$ equals to 1, $M_{01}$ represents the number of operating conditions where $y_e^k$ equals to 1 but $y_g^k$ equals to 0, $M^{11}$ represents the number of operating conditions where both $y_e^k$ and $y_g^k$ equal to 0, where k=1,2, . . . ,$s_0$.

(3-2) a feature set $\{(\check{P}_{Gi}{}^m, \check{V}_{Gi}{}^m, \check{P}_{Lj}{}^m \check{Q}_{Lj}{}^m): m \in h(e)\}$ of the operating conditions corresponding to $y_e^k=1$ (a transient stability tag under the e-th predetermined failure in the failure set $Z_2$ equals to 1) and a feature set $\{(\check{P}_{Gi}{}^n, \check{V}_{Gi}{}^n, \check{P}_{Lj}{}^n \check{Q}_{Lj}{}^n): n \in h(g)\}$ of the operating conditions corresponding to $y_e^k=1$ (a transient stability tag under the g-th predetermined failure in the failure set $Z_2$ equals to 1) are obtained, and a Hausdorff distance between $\{(\check{P}_{Gi}{}^m, \check{V}_{Gi}{}^m, \check{P}_{Lj}{}^m, \check{Q}_{Lj}{}^m)$ $m \in h(e)\}$ and $\{(\check{P}_{Gi}{}^n, \check{V}_{Gi}{}^n, \check{P}_{Lj}{}^n \check{Q}_{Lj}{}^n): n \in h(g)\}$ is calculated and denoted as H(e,g). h(e) represents a set of the operating conditions corresponding to $y_e^k=1$, and h(g) represents a set of the operating conditions corresponding to $y_g^k=1$.

(3-3) the similarity evaluation index D(e,g) between different predetermined failures in the failure set $Z_2$ is calculated based on J(e,g) obtained in step (3-1) and H(e,g) obtained in step (3-2).

$$D(e,g)=w_1 \times J(e,g)+w_2 \times H(e,g)$$

$w_1$ and $w_2$ represent predetermined weights and satisfy $w_1+w_2=1$. In an embodiment of the present disclosure, $w_1=0.5$ and $w_2=0.5$.

(3-4) based on the similarity evaluation index D(e,g) between different predetermined failures in the failure set $Z_2$ obtained in step (3-3), the b predetermined failures in the failure set $Z_2$ are clustered to obtain B clusters. The l-th cluster includes p(l) predetermined failures, l=1, . . . , B. The l-th cluster may be denoted as $C(l)=\{q(l)_1, q(l)_2, \ldots, q(l)_{r(l)}, \ldots, q(l)_{p(l)}\}$. $q(l)_{r(l)}$ represents a numerical order of the predetermined failure (whose numerical order is r(l)-th in the l-th cluster C(l)) in the failure set $Z_2$, where r(l)=1, . . . , p(l). The clustering algorithm and the cluster number B may be set according to human experiences. Or the cluster number B may be set to 2, 3, . . . ,b. Silhouette coefficients of cluster results corresponding to different cluster numbers are calculated, and the cluster number corresponding to the highest silhouette coefficient is determined as the optimum cluster number. In an embodiment of the present disclosure, the clustering algorithm may be a spectral clustering algorithm. And the cluster number is determined to B=2 based on the highest silhouette coefficient.

(4) a multi-task siamese neural network for the transient stability assessment is trained based on the data set $O_0$ obtained in step (1), the data set $O_{new}$ obtained in step (2) and the B cluster results obtained in step (3). The step may include the following.

Figure 2A:
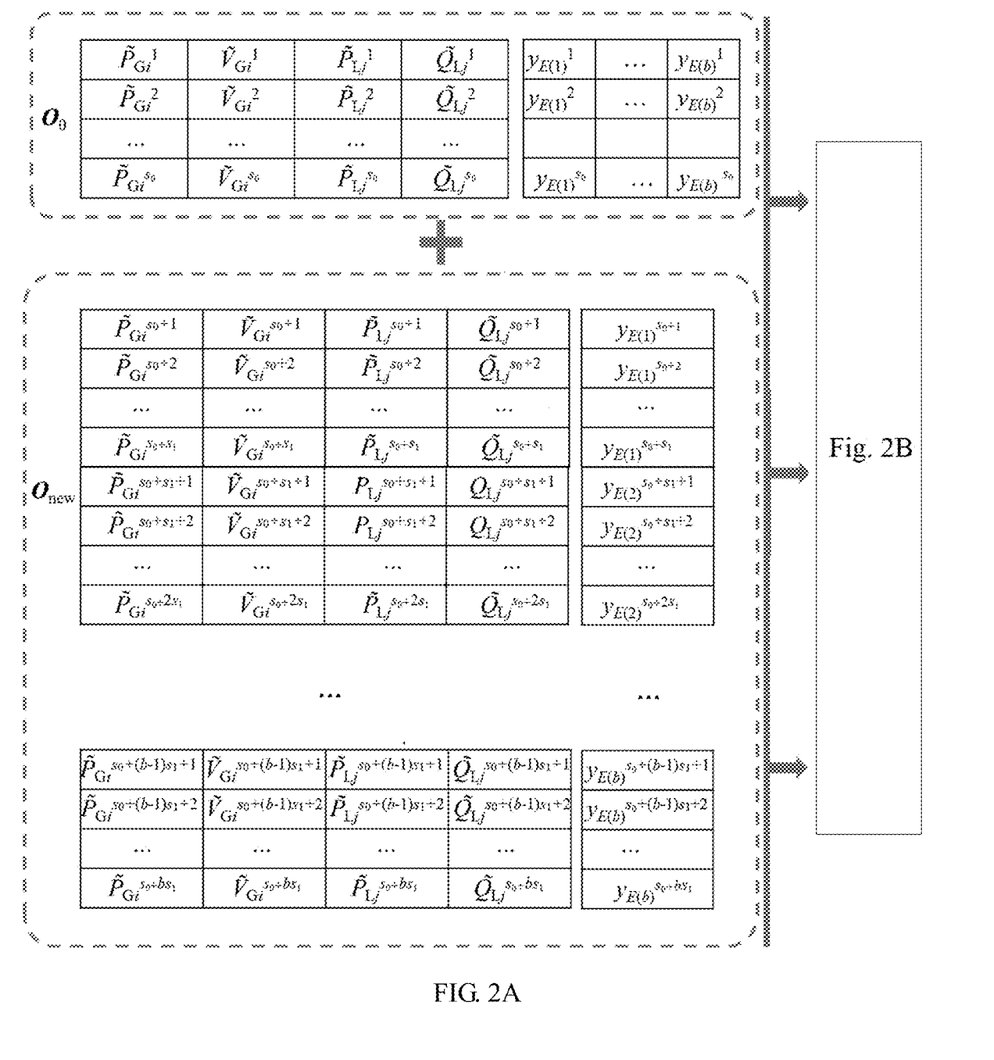

(4-1) the data set $O_0$ obtained in step (1-4) and the data set $O_{new}$ obtained in step (2-3) are classified into b data sets $D_{fault}(1), D_{fault}(2), \ldots, D_{fault}(b)$ corresponding respectively to the b predetermined failures in step (1-3) based on difference in the predetermined failures. The input features of the data set corresponding to the e-th predetermined failure include a normalized active power $\tilde{P}_{Gi}^{u(e)}$ and a normalized generator voltage $\tilde{V}_{Gi}^{u(e)}$ of each generator, a normalized active power $\tilde{P}_{Lj}^{u(e)}$ and a normalized reactive power $\tilde{Q}_{Lj}^{u(e)}$ of each line before the failure occurs. The transient stability tag of each data set is denoted as $y_e^{u(e)}$. u(e) represents the u(e)-th operating condition corresponding to the e-th predetermined failure, and u(e)=1, 2, . . . , $s_0$, $s_0+s_1\times(e-1)\times b+1$, $s_0+s_1\times(e-1)\times b+2$, . . . , $s_0+s_1\times e\times b$. A schematic diagram of the data sets is shown in FIG. 2A and FIG. 2B.

Figure 1B:
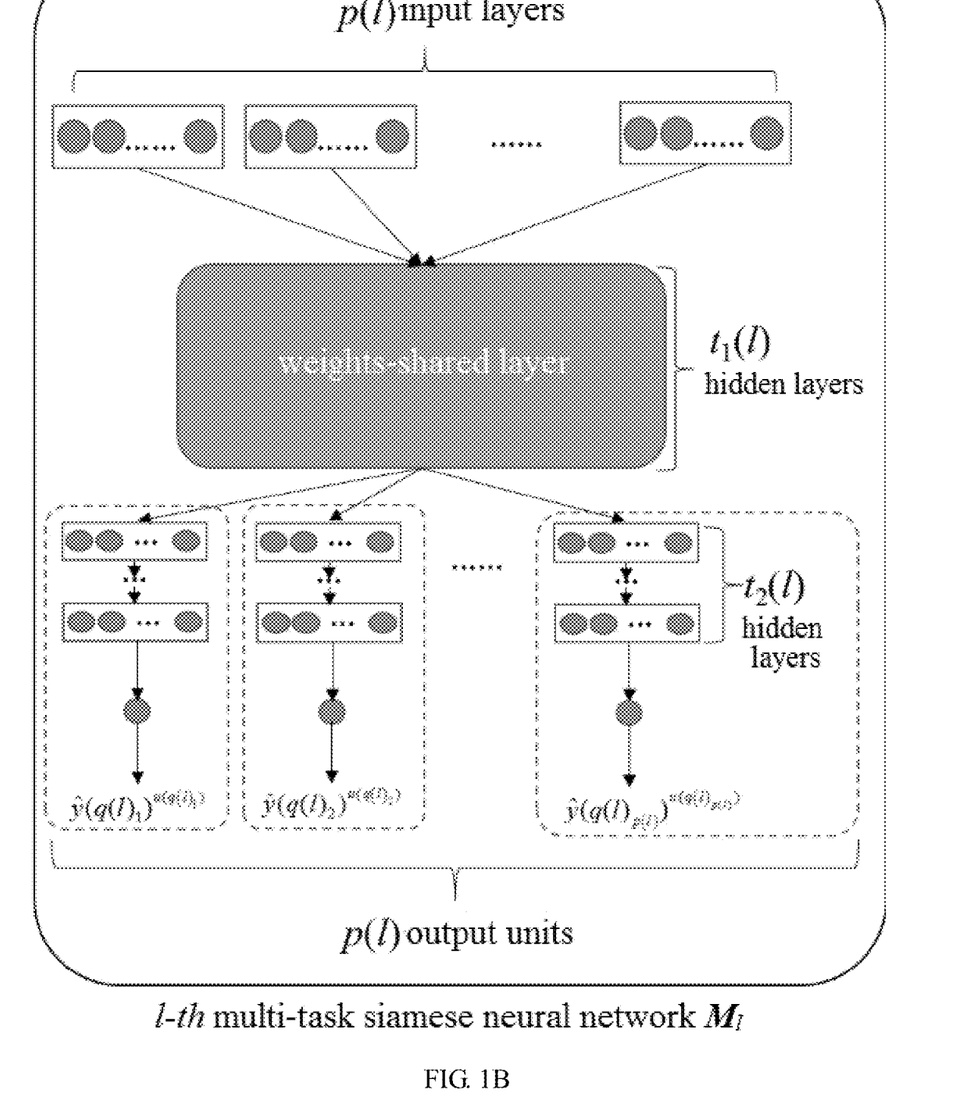
FIG. 1B is a schematic diagram showing a l-th multi-task siamese neural network $M_l$ as mentioned in step (4) of FIG. 1A.

(4-2) B multi-task siamese neural networks for the transient stability assessment are obtained by training based on the data sets $D_{fault}(1), D_{fault}(2), \ldots, D_{fault}(b)$ obtained in step (4-1), the cluster results in step (3-4) and a siamese neural network training algorithm. The training data used by l-th multi-task siamese neural network $M_l$ is the data sets $D_{fault}(q(l)_1), D_{fault}(q(l)_2), \ldots, D_{fault}(q(l)_{r(l)}), \ldots, D_{fault}(q(l)_{p(l)}(y))$ corresponding to the predetermined failures in the l-th cluster C(l). A structure of $M_l$ may be described as follows, as illustrated in FIG. 1B.

(4-2-1) p(l) Input Layers of $M_l$ $M_l$ includes p(l) input layers. The r(l)-th input layer includes $2\times N+2\times M$ neurons. The inputs of each neuron may include a normalized active power $\tilde{P}_{Gi}^{u(q(i)r(l))}$ and a normalized generator voltage $\tilde{V}_{Gi}^{u(q(i)r(l))}$ of each generator, a normalized active power $P_{Lj}^{u(q(i)r(l))}$ and a normalized reactive power $\tilde{Q}_{Lj}^{u(q(i)r(l))}$ of each line before the failure occurs. $u(q(l)_{r(l)})$ represents the u(q(l)r(1))-th operating condition corresponding to the $q(l)_{r(l)}$-th predetermined failure in the l-th cluster.

(4-2-2) Parameter-Shared Unit of $M_l$

The parameter-shared unit of $M_l$ includes $t_1(l)$ hidden layers. The inputs of the first hidden layer $h_1(l)$ may be the p(l) input layers of $M_l$ in step (3-2-1). The inputs of the c-th hidden layer $h_c(l)$ may be outputs of the (c-1)-th hidden layer $h_{c-1}(l)$, where c=2, . . . , $t_1(l)$. The number $t_1(l)$ of the hidden layers and the number of neurons in each hidden layer may be determined according to human experiences or repeated experiments meeting a calculation precision. In an embodiment of the present disclosure, $t_1(l)=3$, i.e., the parameter-shared unit of the l-th neural network $M_l$ may include three hidden layers. The first hidden layer may include 128 neurons, the second hidden layer may include 64 neurons and the third hidden layer may include 32 neurons.

(4-2-3) p(l) Output Units of $M_l$

The p(l) output units of $M_l$ may include $t_2(l)$ hidden layers and one output layer. The inputs of the first hidden layer in each output unit may be outputs of the $t_1(l)$-th hidden layer of the parameter-shared unit in step (4-2-2). The number $t_2(l)$ of hidden layers and the number of neurons in each hidden layer may be determined according to human experiences or repeated experiments meeting a calculation precision. In an embodiment of the present disclosure, $t_2(l)=1$, i.e., each output unit may include one hidden layer and the number of neurons in the hidden layer may be 32. The output layer may include one neuron, and the output layer may adopt the Sigmoid function as an activation function. The output of the r(l)-th output unit of $M_l$ may be $\hat{y}(q(l)_{r(l)}^{u(q(l)^{r(l)})})$. When $\hat{y}(q(l)_{r(l)}^{u(q(l)^{r(l)})}) > 0.5$, it indicates that the transient instability occurs in the electric power system after the $q(l)_{r(l)}$-th predetermined failure in the l-th cluster occurs under the $u(q(l)_{r(l)})$-th operating condition. When $\hat{y}(q(l)_{r(l)}^{u(q(l)^{r(l)})}) \leq 0.5$, it indicates that the electric power system maintains transient stability after the q(l)r(-th predetermined failure in the l-th cluster occurs under the $q(l)_{r(l)}$-th operating condition.

(5) the transient stability assessment results of the electric power system under all the f predetermined failures in the failure sets $Z_0$, $Z_1$ and are $Z_2$ are obtained based on the statistical result of the transient stability tags in step (1-3) and the multi-task siamese neural networks obtained in step (4). The step may include the following.

(5-1) the transient stability assessment results of the electric power system under the predetermined failures in the failure sets $Z_0$ and $Z_1$ in step (1-3) are obtained based on the statistical result of the transient stability tags in step (1-3). The step may include the following.

(5-1-1) the transient stability assessment results of the electric power system under the predetermined failures in the failure set $Z_0$ in step (1-3) are determined as maintaining transient stability.

(5-1-2) the transient stability assessment results of the electric power system under the predetermined failures in the failure set $Z_1$ in step (1-3) are determined as occurring transient instability.

(5-2) the B multi-task siamese neural networks obtained in step (4) are used to obtain the transient stability assessment results of the electric power system under the b predetermined failures in the failure set $Z_2$ in step (1-3). The step may include the following.

(5-2-1) an active power $P_{Gi}$ and a generator voltage $V_{Gi}$ of each generator, an active power $P_{Lj}$ and an reactive power $Q_{Lj}$ of each line of the electric power system are collected from a data collecting and monitoring system or a wide are measurement system to construct initial input features.

(5-2-2) the maximum-minimum normalization described in step (1-2) is used to normalize the initial input features to obtain normalized input features.

(5-2-3) the normalized input features obtained in step (5-2-2) are inputted into the B multi-task siamese neural networks obtained in step (4) to obtain the transient stability assessment results of the electric power system under the b predetermined failures in the failure set $Z_2$ in step (1-3).

What is claimed is:

1. A transient stability assessment method for an electric power system, comprising:
   collecting steady-state data of the electric power system before a failure occurs and transient stability tags from transient stability simulation data;
   obtaining data sets under different predetermined failures based on a statistical result of the transient stability tags and a maximum-minimum method;
   constructing a similarity evaluation index between different predetermined failures based on a Jaccard distance and a Hausdorff distance;
   clustering the different predetermined failures based on a clustering algorithm;
   training a parameters-shared siamese neural network for different predetermined failures in each cluster to obtain a multi-task siamese neural network for the transient stability assessment; and
   obtaining transient stability assessment results of the electric power system under all the predetermined failures based on the statistical result of the transient stability tags and the multi-task siamese neural network for the transient stability assessment.

2. The method of claim 1, comprising:
   (1) setting so operating conditions based on historical operational aspects and future plannings of the electric power system in consideration of a situation that the electric power system has heavy loads in future, setting $f$ predetermined failures for each operating condition, performing a simulating calculation on transient stabilities of the electric power system under the $f$ predetermined failures occurring in the so operating conditions using a numerical computation method, respectively, collecting generator features and line features before a failure occurs as well as transient stability tags under different predetermined failures, and obtaining a data set $O_0$ based on a statistical result of the transient stability tags and a maximum-minimum normalization method; wherein the step (1) includes the following:

(1-1) for the electric power system having N generators, setting the $s_0$ operating conditions based on the historical operational aspects and the future plannings of the electric power system in consideration of the situation that the electric power system has heavy loads in future, setting the $f$ predetermined failures for each operating condition, performing a simulating calculation on the transient stabilities of the electric power system under the $f$ predetermined failures occurring in the so operating conditions using a numerical computation method, respectively, collecting active power $P_{Gi}^k$ and a generator voltage $V_{Gi}^k$ of each generator, an active power $P_{Lj}^k$ and an reactive power $Q_{Lj}^k$ of each line before the failure occurs as well as the transient stability tags $[y_1^k, y_2^k, \ldots, y_a^k, \ldots, y_f^k]$ in the k-th operating condition to construct a raw data set $[P_{Gi}^k, V_{Gi}^k, P_{Lj}^k, Q_{Lj}^k y_1^k, y_2^k, \ldots, y_a^k, \ldots, y_f^k]$, where k represents a numerical order of the operating condition, which indicates the k-th operating condition in the so operating conditions, $k=1,2,\ldots,s_0$, i represents the i-th generator, $i=1,\ldots,N$, j represents the j-th line, $j=1,\ldots,M$, M represents a total number of lines in the electric power system, $y_a^k$ represents the transient stability tag of the electric power system under the a-th predetermined failure occurring in the k-th operating condition, a represents the a-th predetermined failure, $a=1,\ldots f$ wherein when a transient instability occurs in the electric power system after the a-th predetermined failure occurs in the k-th operating condition, $y_a^k=1$; and when the electric power system maintains transient stability after the a-th predetermined failure occurs in the k-th operating condition, $y_a^k=0$;

(1-2) normalizing $P_{Gi}^k$, $V_{Gi}^k$, $P_{Lj}^k$ and $Q_{Lj}^k$ in the raw data set obtained in step (1-1) based on the maximum-minimum normalization method to obtain a normalized active power $\tilde{P}_{Gi}^k$ and a normalized generator voltage $\tilde{V}_{Gi}^k$ of each generator, a normalized active power $\tilde{P}_{Lj}^k$ and a normalized reactive power $\tilde{Q}_{Lj}^k$ of each line before the failure occurs in the k-th operating condition, wherein a normalization formula is denoted as follows:

$$\tilde{P}_{Gi}^k = \frac{P_{Gi}^k - \min_{k=1,\ldots,s_0}(P_{Gi}^k)}{\max_{k=1,\ldots,s_0}(P_{Gi}^k) - \min_{k=1,\ldots,s_0}(P_{Gi}^k)}$$

$$\tilde{V}_{Gi}^k = \frac{V_{Gi}^k - \min_{k=1,\ldots,s_0}(V_{Gi}^k)}{\max_{k=1,\ldots,s_0}(V_{Gi}^k) - \min_{k=1,\ldots,s_0}(V_{Gi}^k)}$$

-continued $$\tilde{P}_{Lj}^k = \frac{P_{Lj}^k - \min_{k=1,\ldots,s_0}(P_{Lj}^k)}{\max_{k=1,\ldots,s_0}(P_{Lj}^k) - \min_{k=1,\ldots,s_0}(P_{Lj}^k)}$$

$$\tilde{Q}_{Lj}^k = \frac{Q_{Lj}^k - \min_{k=1,\ldots,s_0}(Q_{Lj}^k)}{\max_{k=1,\ldots,s_0}(Q_{Lj}^k) - \min_{k=1,\ldots,s_0}(Q_{Lj}^k)}$$

(1-3) counting values of the transient stability tags $[y_1^k, y_2^k, \ldots, y_a^k, \ldots, y_f^k]$ in the $s_0$ operating conditions obtained in step (1-1) wherein when the transient stability tag $y_a^k$ under the a-th predetermined failure satisfies $$\sum_{k=1}^{s_0} y_a^k = s_0,$$

the a-th predetermined failure is classified into a $k=1$ failure set $Z_1$ for which a subsequent construction of siamese neural network is not performed, when the transient stability tag $y_a^k$ under the a-th predetermined failure satisfies $$\sum_{k=1}^{s_0} y_a^k = 0,$$

the a-th predetermined failure is classified into a failure set $Z_0$ for which the subsequent construction of siamese neural network is not performed, and when the transient stability tag $y_a^k$ under the a-th predetermined failure satisfies $$0 < \sum_{k=1}^{s_0} y_a^k < s_0,$$

the a-th predetermined failure is classified into a failure set $Z_2$, wherein the failure set $Z_2$ includes b predetermined failures which are denoted as $E(1), E(2), \ldots, E(b)$, and the transient stability tags of the b predetermined failures are denoted as;

(1-4) obtaining a pre-processed data set $O_0$ based on $\tilde{P}_{Gi}^k$, $\tilde{V}_{Gi}^k$, $\tilde{P}_{Lj}^k$ and $\tilde{Q}_{Lj}^k$ obtained in step (1-2) and the transient stability tags $y_{E(1)}^k, y_{E(2)}^k, \ldots, y_{E(b)}^k$ in the failure set $Z_2$ obtained in step (1-3); wherein the data set $O_0$ is represented as follows:

$$O_0 = [\tilde{P}_{Gi}^k, \tilde{V}_{Gi}^k, \tilde{P}_{Lj}^k, \tilde{Q}_{Lj}^k, y_{E(1)}^k, y_{E(2)}^k, \ldots, y_{E(b)}^k]$$

(2-1) setting $s_1 \times b$ operating conditions based on the historical operational aspects and the future plannings of the electric power system in consideration of the situation that the electric power system has heavy loads in future, performing a transient stability simulating calculation using a numerical computation method in consideration of the b predetermined failures in the failure set $Z_2$ obtained in step (1-3), obtaining generator features and line features before a failure occurs as well as transient stability tags under different predetermined failures from result data of the transient stability simulating calculation, and obtaining a new data set $O_{new}$ based on a statistical result of the transient stability tags and the maximum-minimum normalization method as described in step (1-2), wherein the step (2) includes the following:

(2-1) setting the $s_1 \times b$ operating conditions $s_0+1$, $s_0+2, \ldots, s_0+s_1 \times b$ based on the historical operational aspects and the future plannings of the electric power system in consideration of the situation that the electric power system has heavy loads in future, performing the transient stability simulating calculation on the $E(1+\lfloor(d-1-s_0)/s_1\rfloor)$-th predetermined failure in the failure set $Z_2$ occurring in the d-th operating condition obtained in step (1-3) using the numerical computation method, collecting an active power $P_{Gi}^d$ and a generator voltage $V_{Gi}^d$ of each generator, an active power $P_{Lj}^d$ and an reactive power $Q_{Lj}^d$ of each line before a failure occurs as well as the transient stability tags $y_{E(1+\lfloor(d-1-s_0)/s_1\rfloor)}^d$ in the d-th operating condition to obtain a data set $[P_{Gi}^d, V_{Gi}^d, P_{Lj}^d, Q_{Lj}^d, y_{E(1+\lfloor(d-1-s_0)/s_1\rfloor)}^d]$, where $d=s_0+1, s_0+2, \ldots, s_0+s_1 \times b$;

(2-2) normalizing $P_{Gi}^d, V_{Gi}^d, P_{Lj}^d$ and $Q_{Lj}^d$ in the data set $[P_{Gi}^d, V_{Gi}^d, P_{Lj}^d, Q_{Lj}^d, y_{E(1+\lfloor(d-1-s_0)/s_1\rfloor)}^d]$ obtained in step (2-1) based on the maximum-minimumnormalization method as described in step (1-2) to obtain a normalized active power $\tilde{P}_{Gi}^d$ and a normalized generator voltage $\tilde{V}_{Gi}^d$ of each generator, a normalized active power $\tilde{P}_{Lj}^d$ and a normalized reactive power $\tilde{Q}_{Lj}^d$ of each line before the failure occurs in the d-th operating condition;

(2-3) obtaining a pre-processed data set $O_{new}$ based on $\tilde{P}_{Gi}^d$, $\tilde{V}_{Gi}^d$, $\tilde{P}_{Lj}^d$ and $\tilde{Q}_{Lj}^d$ obtained in step (2-2) and the transient stability tags $y_{E(1+\lfloor(d-1-s_0)/s_1\rfloor)}^d$ obtained in step (2-1), wherein the data set $O_{new}$ is represented as follows:

$$O_{new}=[\tilde{P}_{Gi}^d, \tilde{V}_{Gi}^d, \tilde{P}_{Lj}^d, \tilde{Q}_{Lj}^d, y_{E(1+\lfloor(d-1-s_0)/s_1\rfloor)}^d]$$

(3) calculating a similarity evaluation index $D(e,g)$ of the b predetermined failures in the failure set $Z_2$ obtained in step (1-3) based on a Jaccard distance index and a Hausdorff distance index, wherein e represents the e-th predetermined failure in the failure set $Z_2$ obtained in step (1-3), $e=E(1), \ldots, E(b)$, g represents the g-th predetermined failure in the failure set $Z_2$ obtained in step (1-3), $g=E(1), \ldots, E(b)$ and $g \neq e$; clustering the b predetermined failures in the failure set $Z_2$ obtained in step (1-3) based on the similarity evaluation index $D(e,g)$ and the clustering algorithm to obtain B clusters, wherein the i-th cluster includes $p(l)$ predetermined failures, $l=1, \ldots, B$, and the step (3) includes the following:

(3-1) determining a Jaccard distance index between a transient stability tag vector $(y_e^1, y_e^2, \ldots, y_e^{s_0})$ under the e-th predetermined failure in the failure set $Z_2$ occurring in all the so operating operations and a transient stability tag vector $(y_g^1, y_g^2, \ldots y_g^{s_0})$ under the g-th predetermined failure in the failure set $Z_2$ occurring in all the so operating operations as follows:

$$J(e,g) = \frac{M_{01} + M_{10}}{M_{01} + M_{11} + M_{10}}$$

wherein $M_{00}$ represents a number of operating conditions where both $y_e^k$ and $y_g^k$ equal to 0, $M_{01}$ represents a number of operating conditions where $y_e^k$ equals to 0 but $y_g^k$ equals to 1, $M_{10}$ represents a number of operating conditions where $y_e^k$ equals to 1 but $y_g^k$ equals to 0, $M_{11}$ represents a number of operating conditions where both $y_e^k$ and $y_g^k$ equal to 0, where $k-1,2,\ldots,so$;

(3-2) obtaining a feature set $\{(\tilde{P}_{Gi}^m, \tilde{V}_{Gi}^m, \tilde{P}_{Lj}^m, \tilde{Q}_{Lj}^m)$ $m \in h(e)\}$ of the operating conditions corresponding to $y_e^k=1$ which indicates that the transient stability tag $y_e^k$ under the e-th predetermined failure in the failure set $Z_2$ equals to 1 and a feature set $\{(\tilde{P}_{Gi}^n, \tilde{V}_{Gi}^n, \tilde{P}_{Lj}^n, \tilde{Q}_{Lj}^n)$ $n \in h(e)\}$ of the operating conditions corresponding to $y_e^k=1$ which indicates that the transient stability tag $y_g^k$ under the g-th predetermined failure in the failure set $Z_2$ equals to 1, and calculating a Hausdorff distance $H(e,g)$ between $\{(\tilde{P}_{Gi}^m, \tilde{V}_{Gi}^m, \tilde{P}_{Lj}^m, \tilde{Q}_{Lj}^m)$ $m \in h(e)\}$ and $\{(\tilde{P}_{Gi}^n, \tilde{V}_{Gi}^n, \tilde{P}_{Lj}^n, \tilde{Q}_{Lj}^n)$ $n \in h(e)\}$, where $h(e)$ represents a set of the operating conditions corresponding to $y_e^k=1$, and $h(g)$ represents a set of the operating conditions corresponding to $y_g^k=1$;

(3-3) calculating the similarity evaluation index $D(e,g)$ between different predetermined failures in the failure set $Z_2$ based on $J(e,g)$ obtained in step (3-1) and $H(e,g)$ obtained in step (3-2) as follows:

$$D(e,g)=w_1 \times J(e,g)+w_2 \times H(e,g)$$

wherein $w_1$ and $w_2$ represent predetermined weights and satisfy $w_1+w_2=1$;

(3-4) clustering the b predetermined failures in the failure set $Z_2$ based on the similarity evaluation index $D(e,g)$ between different predetermined failures in the failure set $Z_2$ obtained in step (3-3)to obtain the B clusters, wherein the i-th cluster includes $p(l)$ predetermined failures, $l=1, \ldots, B$, the i-th cluster is denoted as $C(l)=\{q(l)_1, q(l)_2, \ldots, q(l)_{r(l)}, \ldots q(l)_{p(l)}\}$, $q(l)_{r(l)}$ represents a numerical order of the predetermined failure whose numerical order is $r(l)$-th in the i-th cluster $C(l)$ in the failure set $Z_2$, where $r(l)=1, \ldots, p(l)$, wherein the clustering algorithm and the cluster number B are set according to human experiences, or the cluster number B is set to 2, 3, ..., b, respectively; calculating silhouette coefficients of clusters corresponding to different cluster numbers, and selecting the cluster number corresponding to a maximum silhouette coefficient as an optimum cluster number;

(4) training the multi-task siamese neural network for the transient stability assessment based on the data set $O_0$ obtained in step (1), the data set $O_{new}$ obtained in step (2) and the B clusters obtained in step (3), wherein The step (4) includes the following:

(4-1) classifying the data set $O_0$ obtained in step (1-4) and the data set $O_{new}$ obtained in step (2-3) into b data sets $D_{fault}(1), D_{fault}(2), \ldots, D_{fault}(b)$ corresponding respectively to the b predetermined failures in step (1-3) based on difference in the predetermined failures, wherein input features of the data set corresponding to the e-th predetermined failure include a normalized active power $\tilde{P}_{Gi}^{u(e)}$ and a normalized generator voltage $\tilde{V}_{Gi}^{u(e)}$ of each generator, a normalized active power $\tilde{P}_{Lj}^{u(e)}$ and a normalized reactive power $\tilde{Q}_{Lj}^{u(e)}$ of each line before the failure occurs; the transient stability tag of each data set is denoted as $y_e^{u(e)}$, wherein $u(e)$ represents the $u(e)$-th operating condition corresponding to the e-th predetermined failure, and $u(e)=1,2, \ldots, s_0, s_0+s_1 \times (e-1) \times b+1, s_0+s_1 \times (e-1) \times b+2, \ldots, s_0+s_1 \times e \times b$;

(4-2) obtaining B multi-task siamese neural networks for the transient stability assessment by training based on the data sets $D_{fault}(1)$, $D_{fault}(2)$, ..., $D_{fault}(b)$ obtained in step (4-1), the clusters in step (3-4) and a siamese neural network training algorithm, wherein training data used for the l-th multi-task siamese neural network $M_l$ is the data sets $D_{fault}(q(l)_1)$, $D_{fault}(q(l)_2)$, ..., $D_{fault}(q(l)_{r(l)}, ..., D_{fault}(q(l)_{p(l)})$ corresponding to the predetermined failures in the l-th cluster $C(l)$; wherein $M_l$ has the following structure:

(4-2-1) $p(l)$ Input Layers of $M_l$ wherein $M_l$ includes $p(l)$ input layers, the $r(l)$-th input layer includes $2 \times N + 2 \times M$ neurons, inputs of each neuron include a normalized active power $\tilde{P}_{Gi}^{u(q(l)^{r(l)})}$ and a normalized generator voltage $\hat{V}_{Gi}^{u(q(l)^{r(l)})}$ of each generator, a normalized active power $\tilde{P}_{Lj}^{u(q(l)^{r(l)})}$ and a normalized reactive power $Q_{Lj}^{u(q(l)^{r(l)})}$ of each line before the failure occurs, where $u(q(l)_{r(l)})$ represents the $u(q(l)_{r(l)}$-th operating condition corresponding to the $q(l)_{r(l)}$-th predetermined failure in the l-th cluster;

(4-2-2) Parameter-Shared Unit of $M_l$ wherein the parameter-shared unit of $M_l$ includes $t_2(l)$ hidden layers, inputs of the first hidden layer $h_1(l)$ include the $p(l)$ input layers of $M_l$ in step (3-2-1), inputs of the c-th hidden layer $h_c(l)$ include outputs of the (c-1)-th hidden layer $h_{c-1}(l)$, where $c=2,...,t_1(l)$, a number $t_1(l)$ of the hidden layers and a number of neurons in each hidden layer are determined according to human experiences or repeated experiments meeting a calculation precision;

(4-2-3) $p(l)$ Output Units of $M_l$ wherein the $p(l)$ output units of $M_l$ include $t_2(l)$ hidden layers and one output layer, inputs of the first hidden layer in each output unit include outputs of the $t_1(l)$-th hidden layer of the parameter-shared unit in step (4-2-2), a number $t_2(l)$ of hidden layers and a number of neurons in each hidden layer are determined according to human experiences or repeated experiments meeting a calculation precision, the output layer includes one neuron, and the output layer adopts the Sigmoid function as an activation function, wherein an output of the $r(l)$-th output unit of $M_l$ is $\hat{y}(q(l)_{r(l)}^{u(q(l)^{r(l)})}$, wherein when $\hat{y}(q(l)_{r(l)}^{u(q(l)^{r(l)})} > 0.5$, it indicates that a transient instability occurs in the electric power system after the $q(l)_{r(l)}$-th predetermined failure in the l-th cluster occurs under the $u(q(l)_{r(l)})$-th operating condition, when $\hat{y}(q(l)_{r(l)}^{u(q(l)^{r(l)})} \leq 0.5$, it indicates that the electric power system maintains transient stability after the $q(l)_{r(l)}$-th predetermined failure under the l-th cluster occurs in the $u(q(l)_{r(l)})$-th operating condition;

(5) obtaining the transient stability assessment results of the electric power system under all the $f$ predetermined failures in the failure sets $Z_0$, $Z_1$ and are $Z_2$ based on the statistical result of the transient stability tags in step (1-3) and the multi-task siamese neural networks obtained in step (4), wherein the step (5) includes the following:

(5-1) obtaining the transient stability assessment results of the electric power system under the predetermined failures in the failure sets $Z_0$ and $Z_1$ in step (1-3) based on the statistical result of the transient stability tags in step (1-3), wherein the step (5-1) includes the following:

(5-1-1) determining the transient stability assessment results of the electric power system under the predetermined failures in the failure set $Z_0$ in step (1-3) as maintaining transient stability;

(5-1-2) determining the transient stability assessment results of the electric power system under the predetermined failures in the failure set $Z_1$ in step (1-3) as occurring transient instability;

(5-2) using the B multi-task siamese neural networks obtained in step (4) to obtain the transient stability assessment results of the electric power system under the b predetermined failures in the failure set $Z_2$ in step (1-3), wherein the step (5-2) includes the following:

(5-2-1) collecting an active power $PG_i$ and a generator voltage $VG_i$ of each generator, an active power $P_{Lj}$ and an reactive power $Q_{Lj}$ of each line of the electric power system from a data collecting and monitoring system or a wide are measurement system to construct initial input features;

(5-2-2) using the maximum-minimum normalization described in step (1-2) to normalize the initial input features to obtain normalized input features;

(5-2-3) inputting the normalized input features obtained in step (5-2-2) into the B multi-task siamese neural networks obtained in step (4) respectively to obtain the transient stability assessment results of the electric power system under the b predetermined failures in the failure set $Z_2$ in step (1-3).

* * * * *